United States Patent
Matsukawa et al.

[11] Patent Number: 6,153,326
[45] Date of Patent: *Nov. 28, 2000

[54] SILICONE RESIN-METAL COMPOSITE

[75] Inventors: Masanori Matsukawa, Toyota; Yoshihiro Fujimi; Takeyuki Tsunekawa, both of Nagahama; Etsuro Yamaguchi, Hiratsuka, all of Japan

[73] Assignees: Aisin Takaoka Co., Ltd.; Mitsubishi Plastics, Inc., both of Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/176,313

[22] Filed: Oct. 22, 1998

[30] Foreign Application Priority Data

Oct. 29, 1997 [JP] Japan .................................. 9-296541

[51] Int. Cl.[7] .............................. H01M 2/00; B32B 15/08
[52] U.S. Cl. ............................ 429/34; 428/215; 428/332; 428/334; 428/335; 428/336; 428/450; 429/12; 429/30; 429/33
[58] Field of Search .................................. 428/450, 332, 428/334, 335, 336, 213, 215; 429/12, 30, 33, 34

[56] References Cited

U.S. PATENT DOCUMENTS 5,134,773  8/1992  Lemaire et al. ........................ 29/827
5,264,299  11/1993  Krasij et al. ............................... 429/30
5,316,644  5/1994  Titterington et al. .................... 204/284
5,526,006  6/1996  Akahane et al. ......................... 343/718
6,080,503  6/2000  Schmid et al. ............................. 429/35

FOREIGN PATENT DOCUMENTS 0 620 609  10/1994  European Pat. Off. .
0 763 568  3/1997  European Pat. Off. .
WO 97/26814  7/1997  WIPO .

OTHER PUBLICATIONS

Patent Abstracts of Japan, vol. 098, No. 002, Jan. 30, 1998, JP 09 280029, Oct. 28, 1997.

Derwent Abstracts, AN 98–015879, JP 09 280029, Oct. 28, 1997.

*Primary Examiner*—D. S. Nakarani
*Attorney, Agent, or Firm*—Oblon, Spivak, McClelland, Maier & Neustadt P.C.

[57] ABSTRACT

A silicone resin-metal composite comprising a thin metal plate and a silicone resin layer formed on at least one side of the thin metal plate by injection molding, wherein a silicone resin layer has a thickness of from 0.05 mm to 1.0 mm and a hardness within a range of from 20 to 70 (JIS K6301 spring type hardness test A).

3 Claims, 10 Drawing Sheets

SILICONE RESIN-METAL COMPOSITE

FIELD OF THE INVENTION

The present invention relates to a silicon resin-metal composite which is suited for use as a cushioning material, a packing material and a spacer for electrical and electronic parts, particularly as a separator of a fuel cell, and is available in complicated shape and reduced size.

BACKGROUND OF THE INVENTION

Heretofore, silicone rubber has been used for the above-mentioned various applications as a cushioning material or a spacer, since it is excellent in heat resistance and electrical insulating properties.

If relatively thin films solely made of such silicone rubber are fitted into electrical and electronic parts, there has been a practical problem such that thin films crease, or that they stick too fast to separate. As a solution to such a problem, a composite laminate obtained by integrating simple silicone rubber and a non-stretchable thin metal plate has been known (Japanese Unexamined Patent Publication JP-A-4-86256 and Japanese Unexamined Utility Model Publication JP-U-2-470).

A usual method for the integration is to press a silicone rubber sheet placed on at least one side of a thin metal plate under heating. However, this method has problems that when the silicone rubber sheet partly covers the thin metal plate, the positioning is difficult, and when the thin metal plate has an uneven surface, it is difficult to join them uniformly.

BRIEF SUMMARY OF THE INVENTION

The present invention is based on a discovery of a silicone resin-metal composite which can solve the above-mentioned problems and provides a silicone resin-metal composite comprising a thin metal plate and a silicone resin layer formed on at least one side of the thin metal plate by injection molding, wherein a silicone resin layer has a thickness of from 0.05 mm to 1.0 mm and a hardness within a range of from 20 to 70 (JIS K6301 spring type hardness test A).

DETAILED DESCRIPTION OF THE INVENTION AND PREFERRED EMBODIMENTS THEREOF

Figure 1:
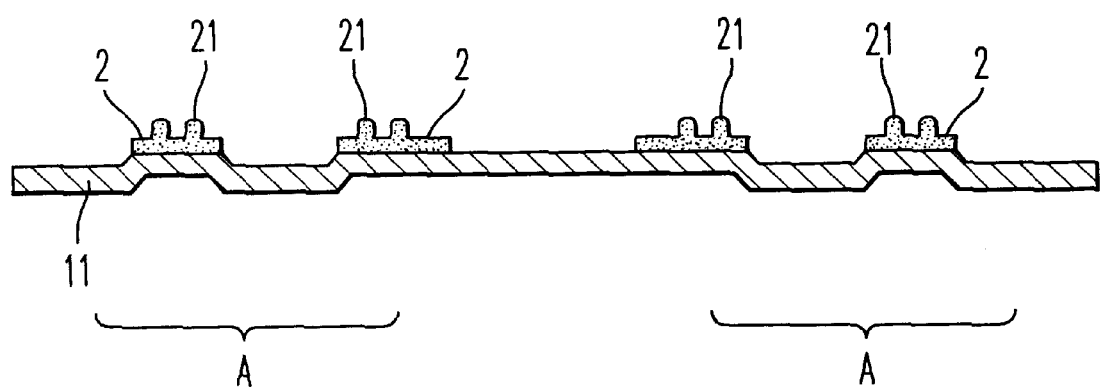
FIG. 1 is a sectional view of a packing material as one embodiment of the composite of the present invention.

Now, the present invention will be described in detail.

As the thin metal plate to be used in the present invention, a steel plate, a stainless steel plate, a plated steel plate, an aluminum plate, a copper plate or a titanium plate is suitable, but the thin metal plate is not restricted to them. The thin metal plate preferably has a thickness of from 0.1 to 2.0 mm and may have an uneven surface which has a three-dimensional structure in various shapes depending on the use and may form fuel gas channels when the composite is used as a separator for a fuel cell, particularly for a solid polymer type fuel cell.

It is preferable to form a primer layer of various kinds on the surface of the thin metal plate which is to be brought in contact with a silicone resin layer in view of adhesiveness. The primer layer is formed by a usual method such as spraying or dipping and preferably has a thickness within a range of from 0.01 $\mu$m to 5.0 $\mu$m. If the thickness is less than 0.01 $\mu$m, it is difficult to control the thickness, and a primer layer thicker than 5.0 $\mu$m is not effective in improving adhesiveness.

On at least one side of the thin metal plate, a silicone resin layer is formed. The silicone resin to be used is a fluid resin, and a usual two-part addition-type fluid silicone resin may be used. A resin with a viscosity of from $10^3$ to $10^4$ poise (25° C.) is favorably used. A resin with a viscosity of less than $10^3$ poise is too ductile to handle, and a resin with a viscosity more than $10^4$ poise is likely to have fluidity inadequate for injection molding.

Further, fillers such as fine silica powder, diatomaceous earth and highly heat conductive inorganic fillers may be added, if necessary.

The present invention is characterized by formation of a silicone resin layer by injection molding. As the method of injection molding, a technique called insert molding may be employed by injecting a resin into a mold holding a thin metal plate inside, at a mold temperature of from 100 to 180° C. and an injection pressure of from 100 to 500 kgf/cm$^2$ under appropriate conditions so as not to form bubbles and fins.

It is necessary that the silicone resin has a thickness within a range of from 0.05 mm to 1.0 mm after injection molding. A silicone resin layer thinner than 0.05 mm is difficult to precisely form by injection molding, hardly has effective elasticity and therefore is inadequate to be used for a packing material. A silicone resin layer thicker than 1.0 mm is difficult to reduce in size to be used as a separator of a fuel cell, particularly of a solid polymer type fuel cell and also has a problem of being costly.

Further, it is necessary that the silicone resin layer has a hardness within a range of from 20 to 70, preferably from 50 to 60, measured in accordance with JIS K6301 spring type hardness test A after injection molding.

If the hardness is less than 20, there are problems that the silicone resin layer is too soft to handle and is too deformable to be used for a packing material. If the hardness is more than 70, there is a problem that the silicone resin layer is too hard and lacks elasticity.

The composite of the present invention may be used as a cushioning material, a packing material, a spacer or an O ring for electrical and electronic parts and can be used preferably as a separator of a fuel cell (a solid polymer type fuel cell). There is a demand for such separators in reduced size, and because plural separators are stacked when used, separators of high precision and high productivity are demanded. The composite of the present invention which has a silicone resin layer formed by injection molding can easily satisfy these demands.

Now, the present invention will be described in further detail with reference to Examples. However, it should be understood that the present invention is by no means restricted to such specific Examples.

EXAMPLE 1

Figure 2:
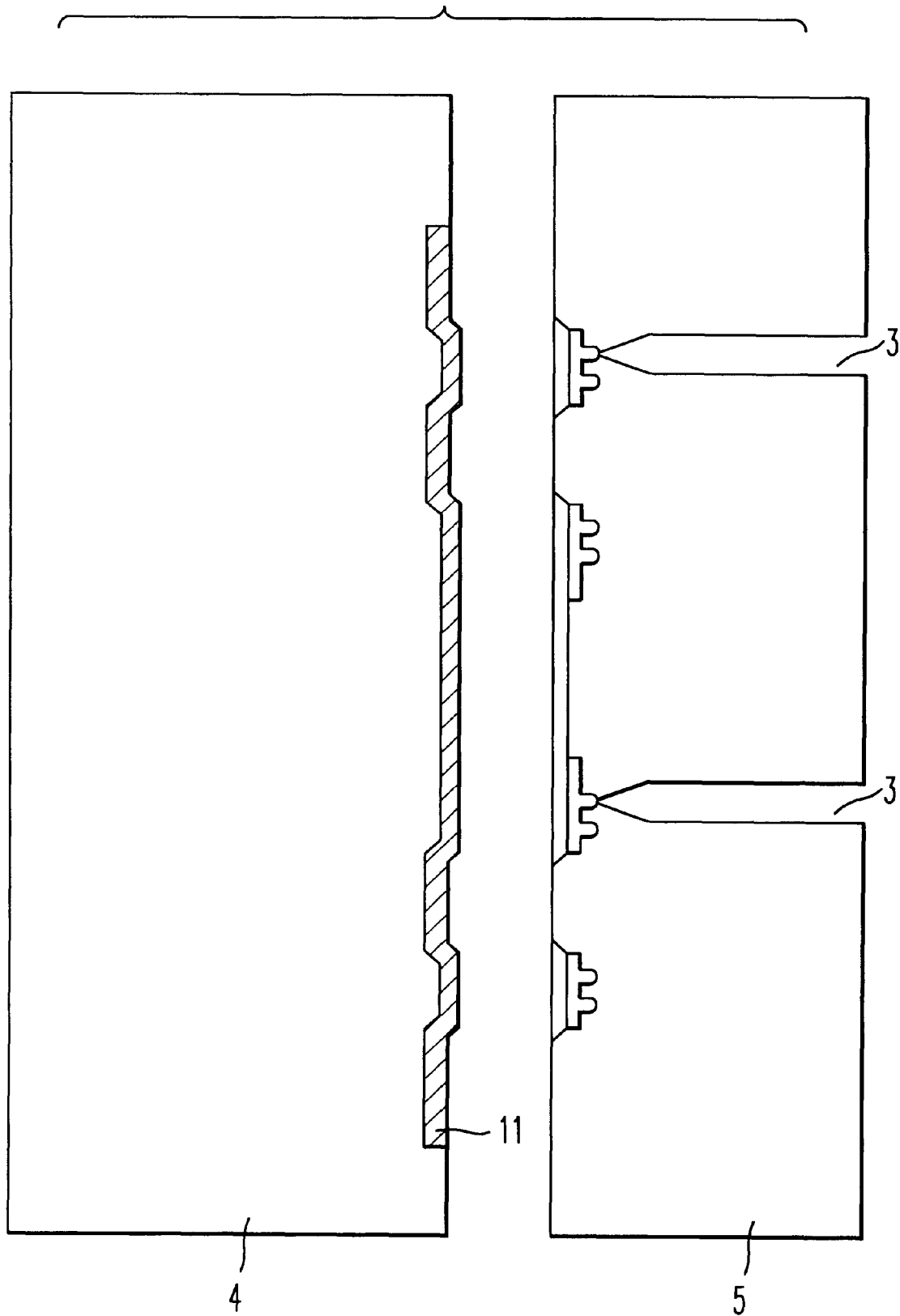
FIG. 2 is a sectional view of an embodiment of the injection mold used for the packing material shown in FIG. 1.

A silicone resin-metal composite packing material having a cross-sectional view illustrated in FIG. 1 was prepared by using an injection mold having a cross-sectional view illustrated in FIG. 2. The packing material shown in FIG. 1 was discoidal and comprises an annular thin metal plate 11 (thickness 0.3 mm) made of stainless steel having irregularities A and a concentric silicone resin layer 2 with ribs 21 formed on part of the surface of the thin metal plate. The packing material was a circular packing with an outer diameter of 200 mm and concentric ribs on part of it and had a silicone resin layer 2 with a thickness of from 60 to 100 $\mu$m and two ribs 21 having a trapezoidal cross-section with a width of 500 $\mu$m and a height of 500 $\mu$m. The silicone resin layer 2 had a hardness of 60.

The packing material was prepared by an injection molding machine using the injection mold having a cross-sectional view illustrated in FIG. 2. As shown in FIG. 2, a stainless steel plate 11 was held on the male mold 4, and a fluid silicone resin was injected through the gates 3 of the female mold 5.

A fluid silicone resin KE-1950-60 manufactured by Shin-Etsu Chemical Co., Ltd. was molded by injection molding on one side of a stainless steel plate (having a primer-treated surface, ME-21 manufactured by Toshiba Silicone Co., Ltd.) at a mold temperature of 160° C. and an injection pressure of 300 kgf/cm². The resulting packing material having a cross-sectional view illustrated in FIG. 1 was released from the mold. The packing material showed good adhesion between the stainless steel plate and the silicone resin layer with no ply separation. It had satisfactory quality as a packing material with no fins or bubbles.

EXAMPLE 2

Next, a silicone resin-metal composite separator for fuel cells prepared by injection molding will be described as another example with reference to FIGS. 3 to 10.

Figure 3:
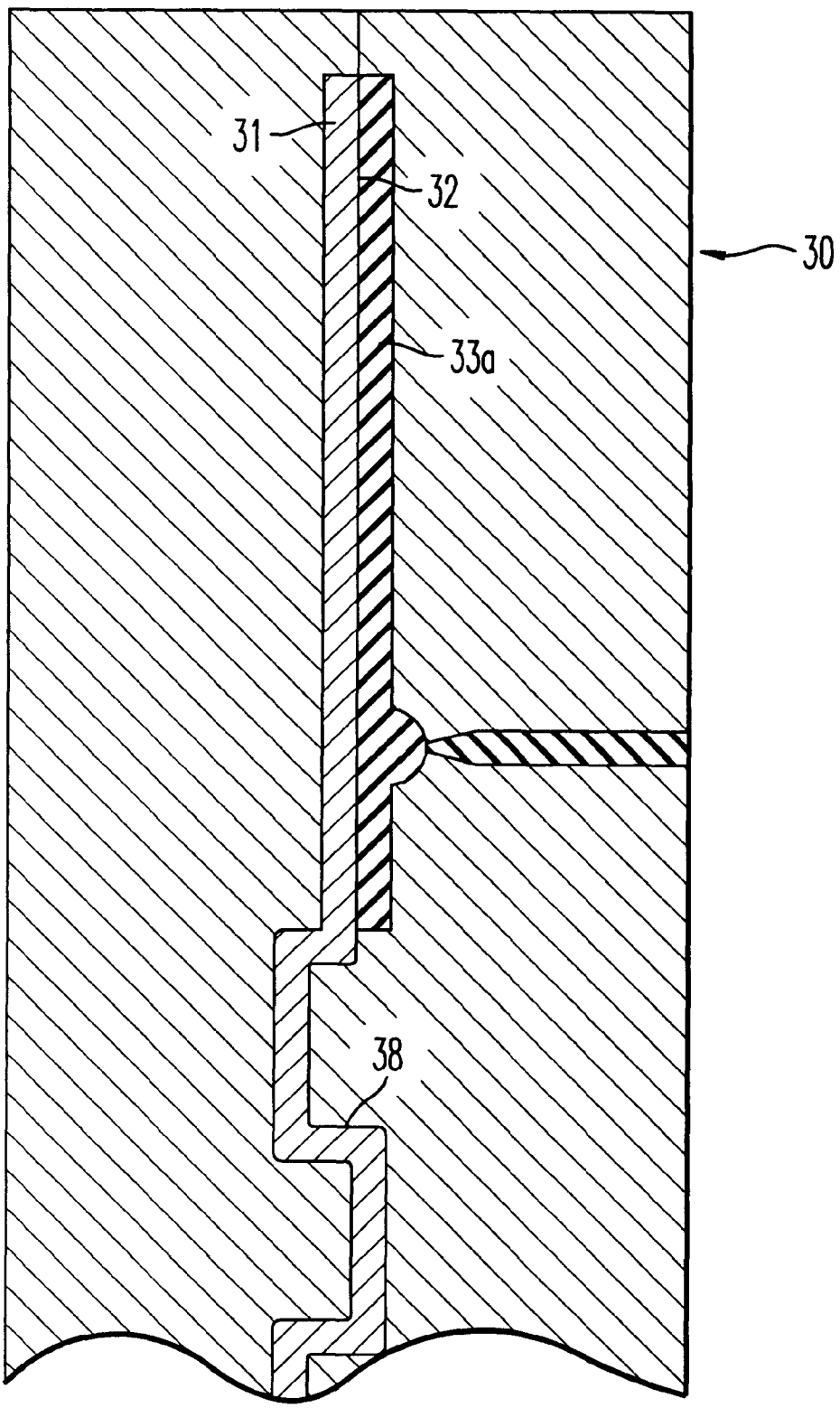
FIG. 3 is a sectional view of the main part of an injection mold used for molding a composite fuel cell separator of the present invention.
Figure 4:
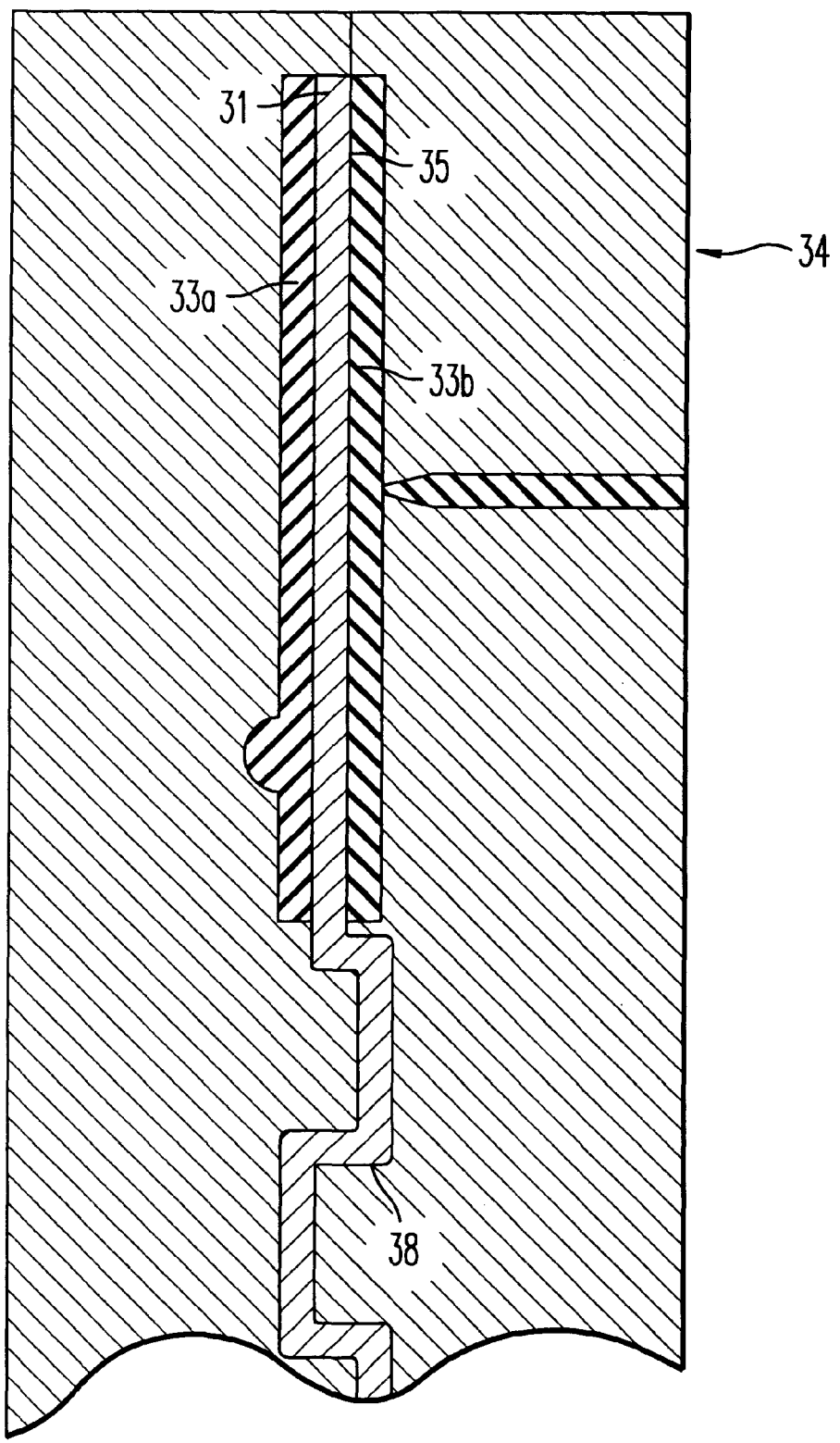
FIG. 4 is a sectional view of the main part of another injection mold other than the injection mold shown in FIG. 3.

A thin metal plate 31 as a metal separator body was set on an injection mold 30 illustrated in FIG. 3, and as a sealing material 33a, a silicone resin layer (hardness 60) was formed by injection molding on one side of the separator body 31. Then the separator body 31 was set on an injection mold 34 illustrated in FIG. 4, and as a sealing material 33b, another silicone resin layer (hardness 60) was formed by injection molding on the other side of the separator body 31 to obtain a fuel cell separator 36 shown in FIGS. 5 and 6.

The separator body 31 was 0.3 mm thick and had an uneven pattern 38 of gas channels made by press molding or etching at the center, and reaction gas holes 40, pinholes 41 and cooling medium channels 42 punctured in the periphery 39. The reaction gas holes 40 and the center 37 were connected by uneven reaction gas paths 43. The top surface of the uneven pattern 38 of gas channels of the separator body 31 formed electrode terminals 44 having a corrosion-resistant and electrically-conductive top coat.

Figure 5:
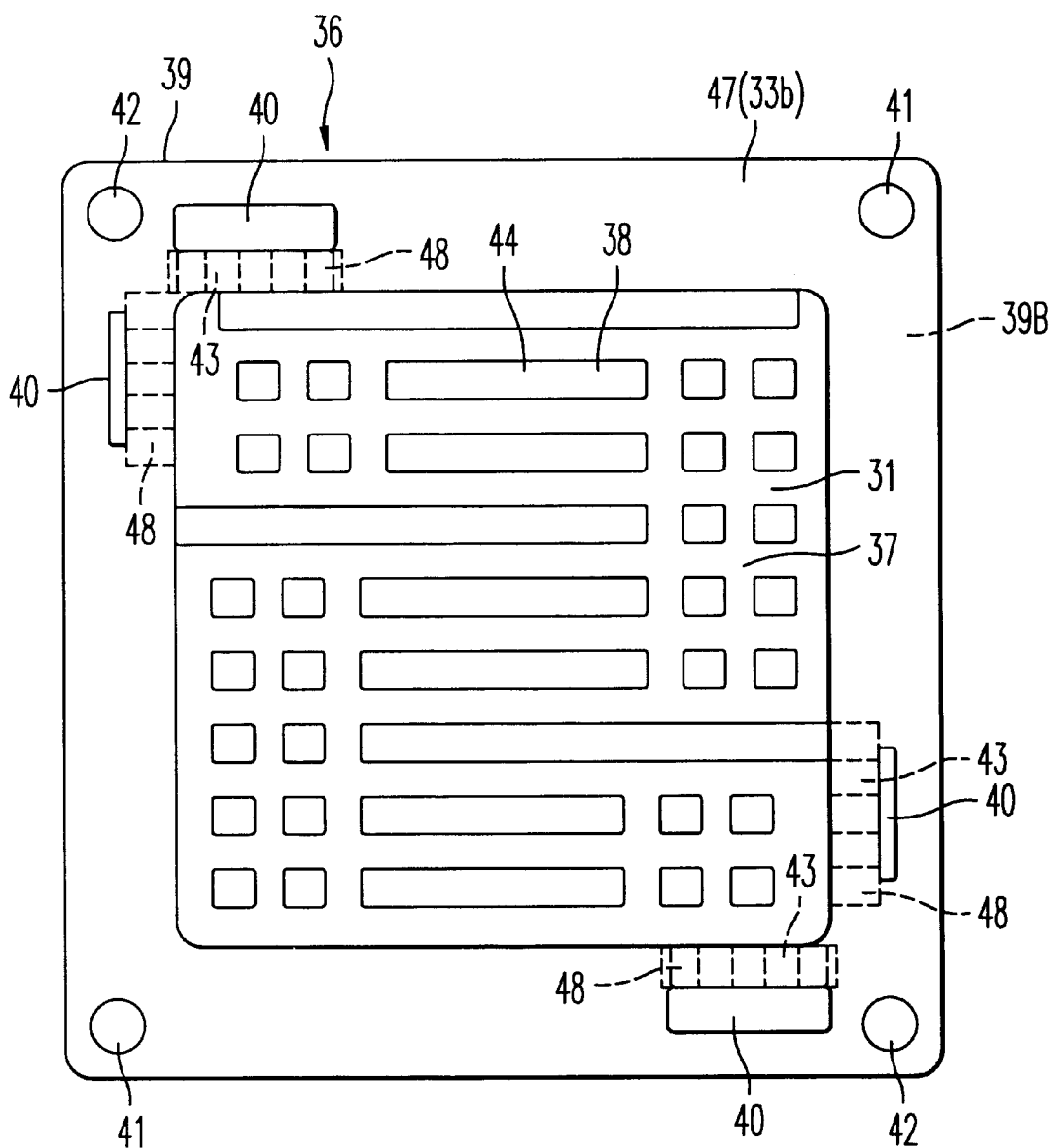
FIG. 5 is a view of a fuel cell separator as an embodiment of the present invention.
Figure 6:
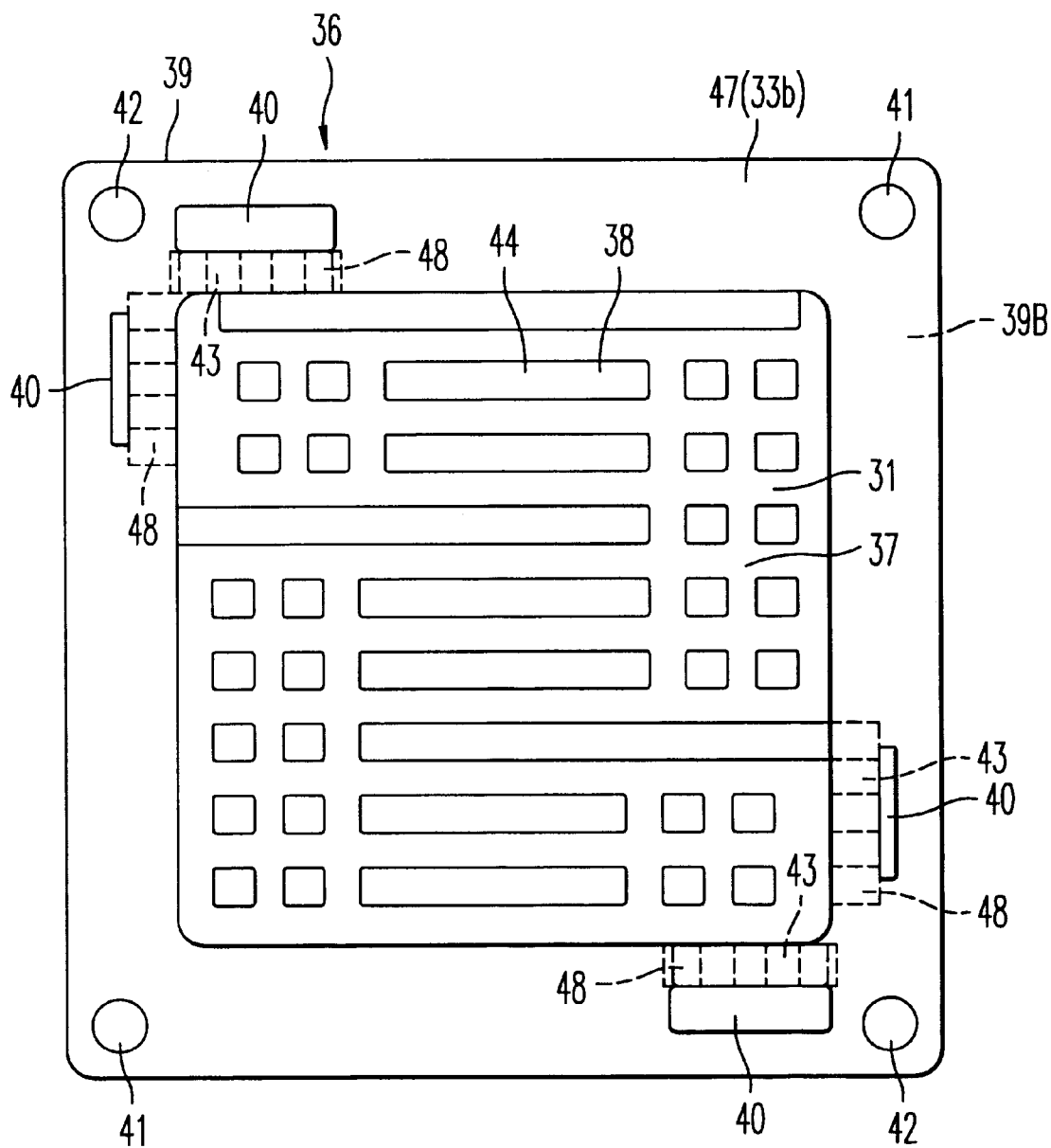
FIG. 6 is a lateral view of the fuel cell separator shown in FIG. 5.
Figure 7:
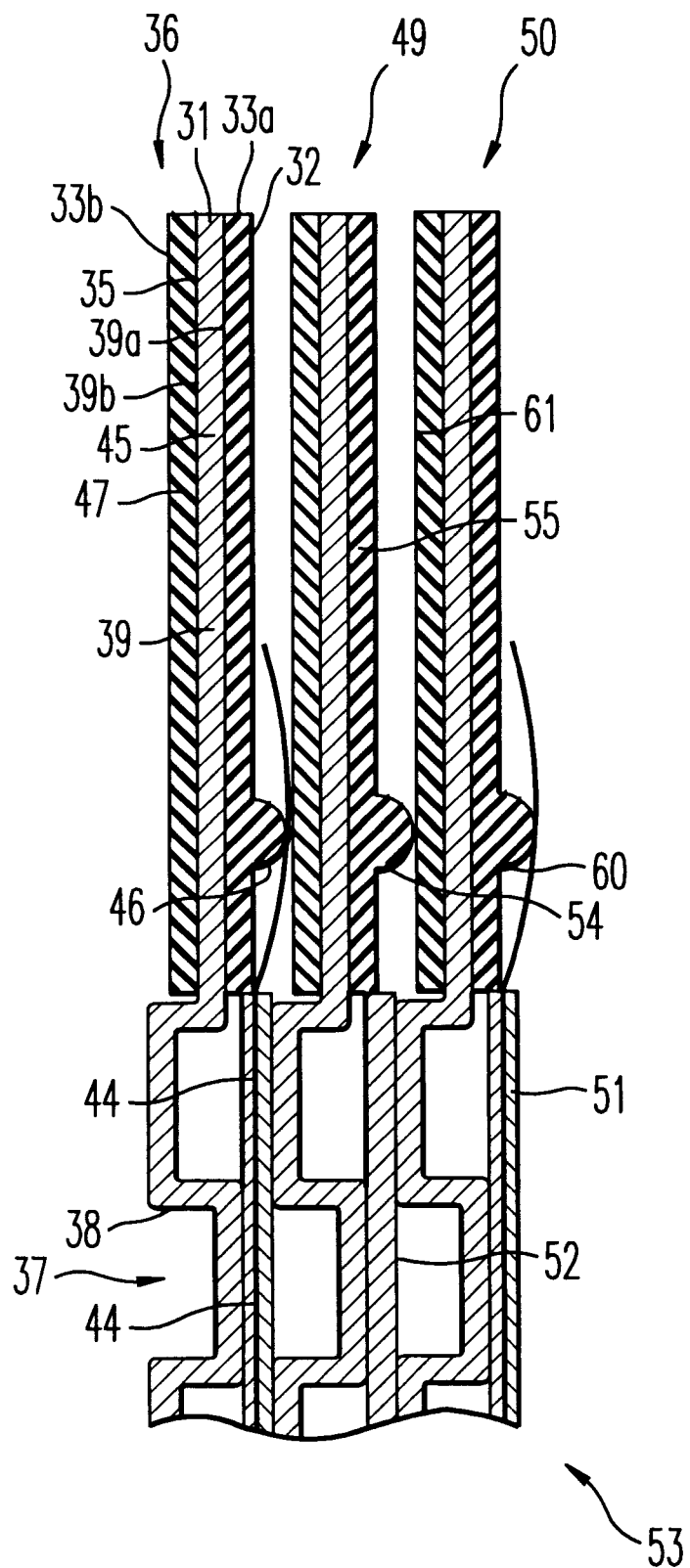
FIG. 7 is a magnified sectional view of the main part of a single cell unit made of plural fuel cell separators arranged in layers.

As shown in FIG. 5 and FIG. 7, the sealing material 33a consisting of a planar body 45 and projected ribs 46 was firmly attached to the periphery 39a on one side 32 of the separator body 31. As shown in FIG. 6 and FIG. 7, a sealing material 33b consisting of a planar body 47 only was firmly attached to the periphery 39b on the other side 35.

At the reaction gas paths 43, corrosion-resistant rigid thin plates 48 (SUS304, thickness 0.1 mm)) were interposed between the peripheries 39a and 39b on both sides of the separator body 31 and the sealing materials 33a and 33b and firmly attached to the sealing materials 33a and 33b to ensure passage of the reaction gas through the reaction paths 43.

The bodies 45 and 47 of the sealing materials 33a and 33b were preferably from 50 to 350 $\mu$m thick, in particular from 60 to 200 $\mu$m thick.

The ribs 46 comprised first ribs 46a formed along the inner periphery of the sealing material 33a, second ribs 46b formed along the outer peripheries of the reaction gas holes and third ribs 46c formed around the outer peripheries of the cooling medium channels 42, and the ribs 46 have a nearly semicircular cross-section with a width of 500 $\mu$m and a height of 500 $\mu$m.

FIG. 7 illustrates a single cell unit 53 assembled from fuel cell separators 36, 49 and 50, electrodes 51 and a spacer 52.

Figure 8:
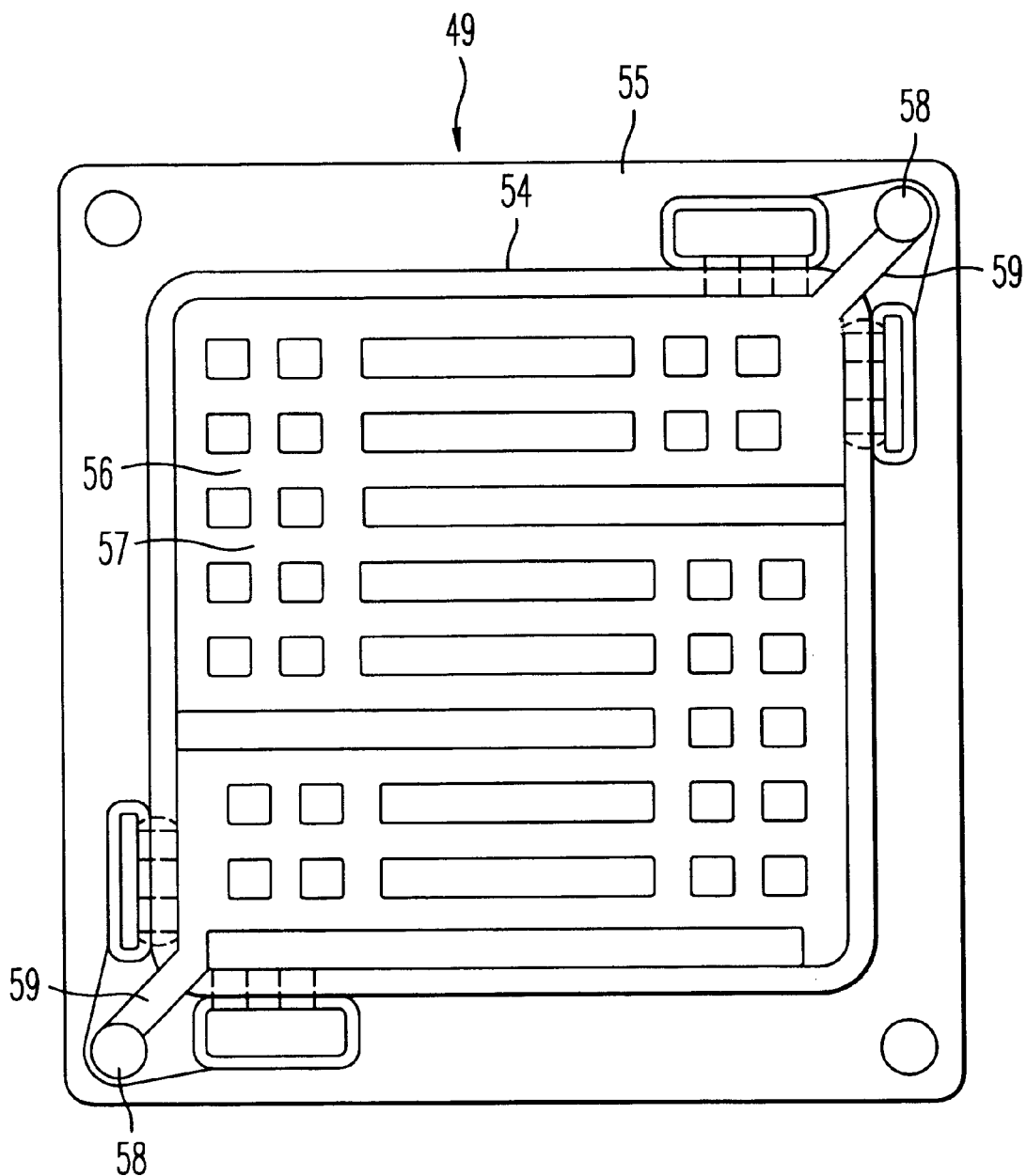
FIG. 8 illustrates another fuel cell separator which constitutes the above-mentioned single cell unit.

FIG. 8 illustrates a fuel cell separator 49 which has the same structure as the fuel cell separator 36 except that cooling medium paths 59 which connect the cooling medium channels 58 with the center 57 of the separator body 56 are formed in the sealing material 55 having ribs 54.

Figure 9:
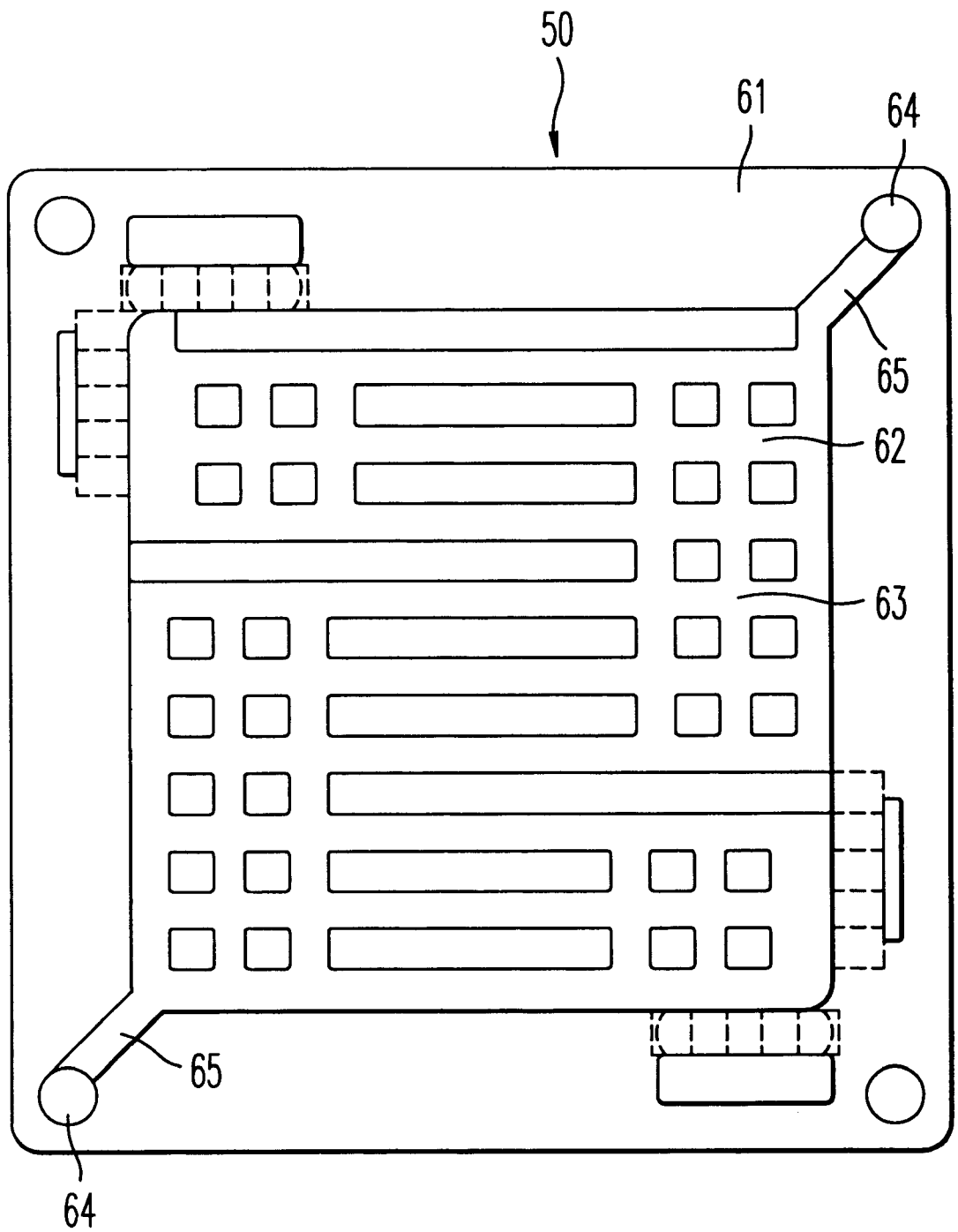
FIG. 9 illustrates still another fuel cell separator that constitutes the above-mentioned single cell unit.

FIG. 9 illustrates a fuel cell separator 50 which has the same structure as the fuel cell separator 36 except that cooling medium paths 65 which connect the cooling medium channels 64 with the center 63 of the separator body 62 are formed in the sealing material 61 having ribs 60.

Figure 10:
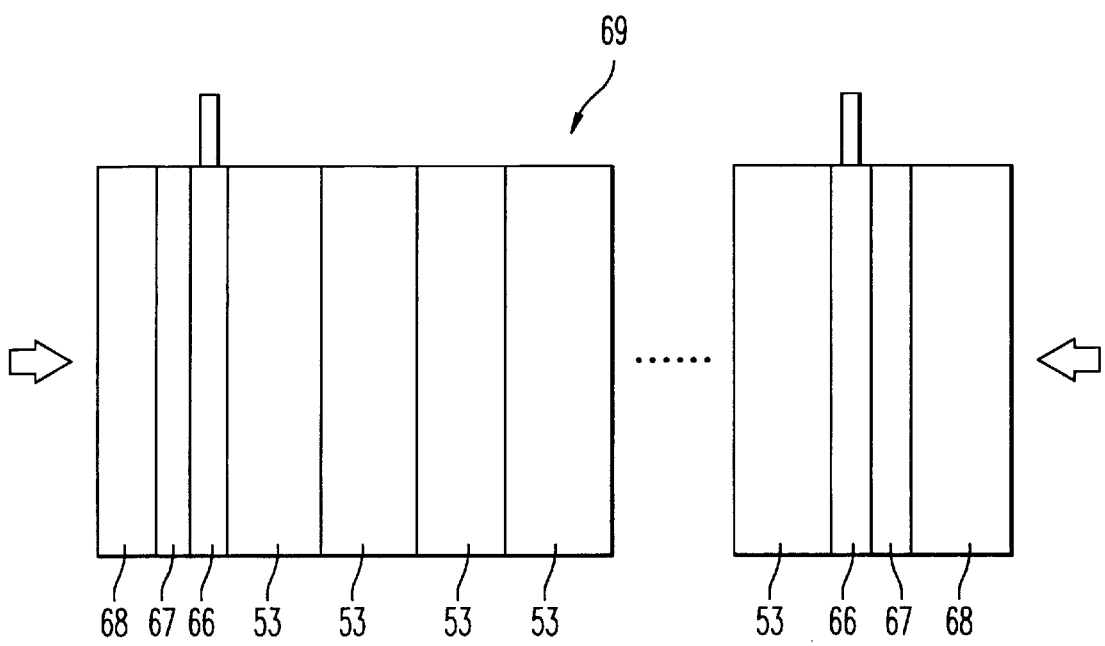
FIG. 10 illustrates a cell stack made by joining the single cell units together.

FIG. 10 illustrates a cell stack obtained by arranging plural single cell units 53 in a stack, providing terminals 66, insulating sheets 67 and pressure plates 68 on both sides of the stack and applying pressing loads (indicated by arrows in FIG. 8) to the pressure plates 68.

The cell stack 69 thus assembled underwent no substantial leaks at a gauge pressure of nitrogen gas of 0.294 MPa and had good durability with no noticeable leaks of the modified gas or air at a gauge pressure of 0.196 MPa while it was actually generating electricity.

As described above, the silicone resin-metal composite of the present invention has an advantage that it can be produced precisely and effectively in three-dimensional shape because the silicone resin layer is formed by injection molding, and is suitable for use as a cushioning material, a packing material, a spacer for various electrical and electronic parts, especially as a separator of a fuel cell (a solid polymer type fuel cell).

What is claimed is:

1. A fuel cell comprising a silicone resin-metal composite as a separator in said fuel cell, wherein the silicone resin-metal composite comprises a thin metal plate having a thickness of 0.1 to 2.00 mm and a silicone resin layer formed on at least one side of the thin metal plate by injection molding, wherein said silicone resin layer has a thickness of from 0.05 mm to 1.0 mm and a hardness JIS K6301 spring type hardness test A within a range of from 20 to 70.

2. The fuel cell according to claim 1, wherein said fuel cell is a solid polymer fuel cell.

3. The fuel cell according to claim 1, wherein said separator comprises channels for fuel gas.

* * * * *

UNITED STATES PATENT AND TRADEMARK OFFICE
CERTIFICATE OF CORRECTION

PATENT NO.     : 6,153,326
DATED          : November 28, 2000
INVENTOR(S)    : Masanori Matsukawa, et al.

It is certified that error appears in the above-identified patent and that said Letters Patent is hereby corrected as shown below:

Title page,
Item [73] the Assignee's address is incorrect, item [73] should read as follows:

-- [73]  Assignee: Aisin Takaoka Co., Ltd., Toyota; Mitsubishi Plastics, Inc., Tokyo, both of Japan --

Signed and Sealed this

Twenty-fifth Day of September, 2001

Attest:

NICHOLAS P. GODICI
Attesting Officer    Acting Director of the United States Patent and Trademark Office